US011101987B2

(12) United States Patent
Singh et al.

(10) Patent No.: US 11,101,987 B2
(45) Date of Patent: Aug. 24, 2021

(54) ADAPTIVE ENCRYPTION FOR ENTITY RESOLUTION

(71) Applicant: International Business Machines Corporation, Armonk, NY (US)

(72) Inventors: Neeraj Ramkrishna Singh, Bangalore (IN); Abhishek Seth, Saharanpur (IN); Soma Shekar Naganna, Bangalore (IN); Martin Oberhofer, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/435,947

(22) Filed: Jun. 10, 2019

(65) Prior Publication Data

US 2020/0389297 A1 Dec. 10, 2020

(51) Int. Cl.
*H04L 9/08* (2006.01)
*H04L 9/32* (2006.01)
*H04L 9/14* (2006.01)
*G06F 21/60* (2013.01)

(52) U.S. Cl.
CPC .......... *H04L 9/0838* (2013.01); *G06F 21/602* (2013.01); *G06F 21/606* (2013.01); *H04L 9/0894* (2013.01); *H04L 9/14* (2013.01); *H04L 9/3213* (2013.01); *H04L 9/3273* (2013.01)

(58) Field of Classification Search
CPC ....... H04L 9/0838; H04L 9/0894; H04L 9/14; H04L 9/3213; H04L 9/3273; G06F 21/602; G06F 21/606
See application file for complete search history.

(56) References Cited

U.S. PATENT DOCUMENTS

| | | | | |
|---|---|---|---|---|
| 2001/0033656 | A1* | 10/2001 | Gligor | H04L 9/0656 380/28 |
| 2012/0134494 | A1* | 5/2012 | Liu | H04L 9/0656 380/44 |
| 2014/0344580 | A1 | 11/2014 | Von Mueller | |
| 2015/0244517 | A1* | 8/2015 | Nita | H04L 9/008 713/168 |
| 2017/0019248 | A1* | 1/2017 | Mustafa | H04L 9/008 |
| 2017/0149557 | A1* | 5/2017 | Bacon | H04L 9/008 |
| 2018/0350324 | A1* | 12/2018 | Woodgate | G02B 6/0066 |

FOREIGN PATENT DOCUMENTS

CN 109245892 A 1/2019

OTHER PUBLICATIONS

Bai et al., "Variable Size Block Encryption using Dynamic-key Mechanism (VBEDM)", International Journal of Computer Applications (0975-8887), vol. 27—No. 7, Aug. 2011, pp. 27-30.

(Continued)

*Primary Examiner* — Ayoub Alata
(74) *Attorney, Agent, or Firm* — David K. Mattheis; Maeve M. Carpenter (57) ABSTRACT

Securely matching encrypted entities by receiving data, segmenting the data into a plurality of categories, selecting encryption key(s) according to a data category of the plurality of data categories, encrypting the data of the data category using the encryption key(s), and comparing the encrypted data to previously encrypted data of the data category.

14 Claims, 4 Drawing Sheets

(56) References Cited

OTHER PUBLICATIONS

Guanghui et al., "Image Encryption with Variable Length Key", IETE Technical Review, published online: Sep. 29, 2015, 15 pages, <https://doi.org/10.1080/02564602.2015.1088412>.

Mirvaziri et al., "Message Based Random Variable Length Key Encryption Algorithm", Journal of Computer Science 5 (8): 573-578, 2009, ISSN 1549-3636, © 2009 Science Publications, pp. 573-578.

Park et al., "Secure Data Encryption for Cloud-Based Human Care Services", Journal of Sensors, vol. 2018, Article ID 6492592, 10 pages, 2018, <https://www.hindawi.com/journals/js/2018/6492592/>.

Shankar et al., "Adaptive optimal multi key based encryption for digital image security", Dec. 2018, 7 pps., Concurrency and Computation Practice and Experience 32(7), <https://www.researchgate.net/publication/329964712_Adaptive_optimal_multi_key_based_encryption_for_digital_image_security>.

\* cited by examiner

ADAPTIVE ENCRYPTION FOR ENTITY RESOLUTION

BACKGROUND

The disclosure relates generally to adaptive encryption for entity resolution. The disclosure relates particularly to securely matching and linking entities using multiple key adaptive encryption.

Sensitive data is typically encrypted while in storage and also encrypted during transfers from one location to another. Decryption methods and associated decryption keys enable systems receiving the encrypted data to decrypt it for processing by applications. Matching encrypted data without possession of the associated decryption key is possible at the cost of significant computational resources to encrypt and store the data.

Homomorphic encryption is a form of encryption which allows computations to be carried out on the encrypted values, enabling comparisons of the values without requiring decryption. A first encrypted value can be compared to a second encrypted value to determine if the values are equal, or the first encrypted value can be evaluated to determine if the value is within a defined range of values, without the need to decrypt the encrypted value.

SUMMARY

Aspects of the invention disclose methods, systems and computer readable media associated with securely matching encrypted entities by receiving data, segmenting the data into a plurality of categories, selecting encryption key(s) according to a data category of the plurality of data categories, encrypting the data of the data category using the encryption key(s), and comparing the encrypted data to previously encrypted data of the data category.

DETAILED DESCRIPTION

Sensitive data can be encrypted during transmission and also encrypted "at rest", when the data is stored. Encrypting the data at runtime, while it is being processed by applications could further increase the security of the data. Matching encrypted records and linking relevant records to each other is possible using homomorphic encryption techniques. Such techniques typically require significant resources in terms of computing resource to encrypt and decrypt the data, as well as significant storage resources required for the encrypted data.

Entity resolution provides for the matching and linking of records from multiple sources. Data can be standardized, categorized, bucketed (indexed) and compared in order for matching and linking to occur. After standardization, additional metadata can be generated for individual records, expanding the scope of the records which can be used for comparisons. Metadata can be mapped to the record in terms of phonetically similar strings, similar address strings, similar names, and nicknames can be mapped to a record to expand the scope of the record to be used in matching and linking to other records. As an example, a record for "Robert" can have nickname metadata: "Bob", and Bobby" mapped to the record for use in matching and linking to other records having sufficient other record fields which match.

After raw data has been standardized and had appropriate metadata added to the records, a token corresponding to the value of each record field can be generated for encrypting. Each token is a string of a characters, and the number of characters is considered the token's length. The encryption key needed to successfully encrypt all tokens in a set must be able to encrypt the longest string of the set.

As an example, a key of "n" bits will be used to encrypt all the tokens in a set. The n-bit key can be used to generate up to $2^n$ unique values. The tokens in the set have a length varying from 1 to a maximum of "T" characters. The set of possible characters includes "S" different characters. The number of possible unique values in the token set is approximately $S^T$. The n-bit key must be large enough that $S^T$ is less than or equal to $2^n$, for successful encryption.

Tokens can be encoded using existing techniques such as American Standard Code for Information Exchange (ASCII) and Unicode Transformation Format (UTF-8) character sets. The ASCII set uses 1 byte (8 bits) for each character. $S=2^8=256$ possible values for each character.

Using the relationship described above for successful encryption for the 256 possible character values:

$256^T <= 2^n$;
$2^{8(T)} <= 2^n$;
$8(T) <= n$;
$T <= n/8$; and
$T = n/8$ (rounded down).

The UTF-8 set can use 4 bytes (32 bits) to encode each character, offering 4 times as many possible values for each character as the ASCII set ($T <= n/32$). Table 1 illustrates the relationship between token string length and key length for ASCII and UTF-8, character sets.

TABLE 1

| KEYID | KEY LENGTH | MAX ASCII LENGTH | MAX UTF-8 LENGTH |
|---|---|---|---|
| K1 | 64 | 8 | 2 |
| K2 | 128 | 16 | 4 |
| K3 | 256 | 32 | 8 |
| K4 | 512 | 64 | 16 |
| K5 | 1024 | 128 | 32 |
| K6 | 2048 | 256 | 64 |

As illustrated in Table 1, a large key, 1024 bits, would be needed to encrypt all strings in a set of strings having lengths up to 128 ASCII characters, or 32 UTF-8 characters.

As an example, a 64-bit key, 8401483555284581057, [binary: 1110100100110000001000011000111110100110000010111111101011000001] could be used for encrypting ASCII strings. A 6-character token, "aaaaaa" can be successfully encrypted with the key, as can an 8-character token: "aaaaaaaa". The 9-character string: "aaaaaaaaa" can be encrypted but will not be reliably decrypted—decryption will not return the value "aaaaaaaaa".

One way to prepare tokens for matching and linking the values later is to convert the token strings into arrays of individual characters and then encrypt each character of the array. Each character of the array can be encrypted using a 32-bit key (for 4 byte [32 bit] UTF-8 characters). Encrypting two strings (lengths L1 and L2) requires L1+L2 encryption operations to create the encrypted arrays for use in matching. A single matching activity based upon edit distance, may require multiple calculations for each of the different tokens to evaluate the edit distance. The costs of the computations and storage for successful encryption, decryption and matching linking grow with the length of the maximum string of the set.

In an embodiment, the system of the invention receives raw data. The data may be numeric, alpha-numeric, or other character string data. The system analyzes and classifies the data. Exemplary classifications include, names, addresses, zip codes, phone numbers, identification numbers, account information, currency data, etc. After analyzing and classifying the data, the system standardizes the data. Standardization can include fixing typographical errors, removing hyphens or commas from long numeric strings, standardizing address formats—uniformly dealing with street names and abbreviations, etc., and generally placing data in each classification in a format defined for that classification.

After standardization, the system places the now standardized data in categories and/or buckets. In an embodiment, the data is placed in categories according to its classification or a data attribute. For example, first names, last names, phone numbers, street addresses, city, state, country, zip code, can each be placed in a distinct category. The categorized data can then be indexed in buckets. Each category/data attribute or bucket is assigned an encryption key defined according to the string length defined for the attribute. Name data may vary from 3 to 12 characters, phone data is typically 10 characters, zip codes are typically 5 characters, while address tokens can be large ~50 characters or more.

Rather than encrypting each field of the record with a key large enough to accommodate the largest field length of the record, in this embodiment of the invention, each field, or attribute is assigned a key having a length able to support the string length of the tokens of the attribute. For example, 30% of all attributes of the record may be encrypted using a 64-bit key (8 ASCII characters), an additional 40% may be covered by a 128-bit key (16 ASCII characters), a further 20% by a 256-bit key (32 ASCII characters), and the final 10% by a 512-bit key (64 ASCII characters). In this example, keys matched to attribute length can reduce the computing and storage requirements for processing the data.

In an embodiment, after standardization, the data is categorized strictly according to string length without regard for data attributes. In this embodiment, the categories are assigned an appropriate key according to the lengths of the strings in each category. The statistical frequency of string lengths can be used to determine how many keys should be assigned. As an example, illustrated in chart 10, of FIG. 1, analysis of the categories indicates that 8% of all the categorized data has a string length of 16 characters or less, 3% has a string length of more than 32 characters, and the remaining 89% has a string length between 16 and 32 characters. In this embodiment, 3 keys, K4, K5, and K6 can be used to encrypt all the data (assuming UTF-8 character strings). In this embodiment, the data be categorized by attribute and then by length to determine the number of keys for each attribute, providing a record of attribute: first name; keyID: K4-K6; value: {encrypted first name value}; or the data can simply be categorized by string length yielding a record of: keyID: K4-KN; value: {encrypted value}.

Figure 2:
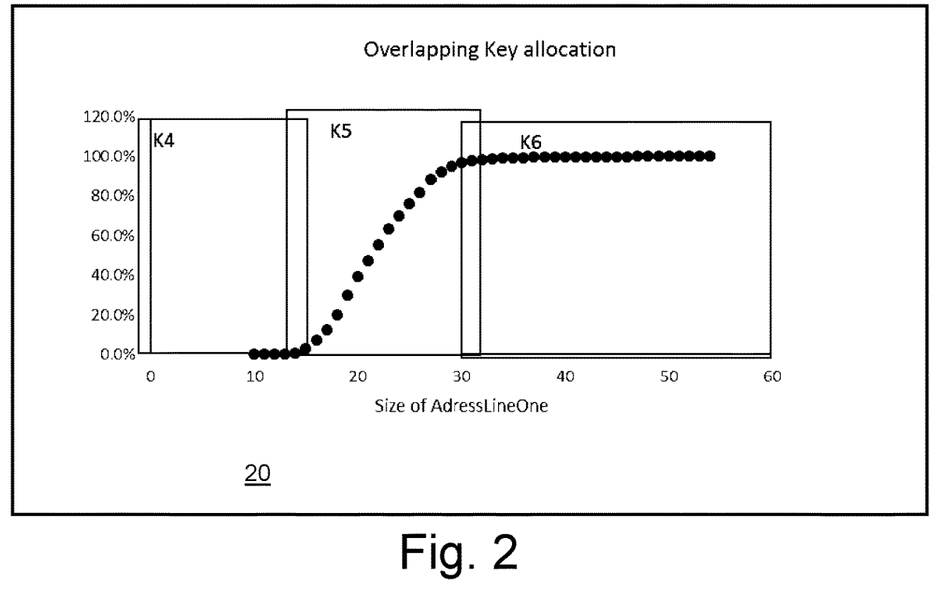
FIG. 2 provides a graphical depiction of a set of encryption keys applied to a data set with overlapping key ranges, according to an embodiment of the invention.

In an embodiment, direct comparison of homomorphically encrypted values to determine if they are equal requires the straight forward comparison of the equality of the two values. Beyond equality, e.g., determining if a first value is within a particular range near a second value can be complicated by the use of different keys for different length character strings. Homomorphically encrypted values can be evaluated to determine if they satisfy a requirement, e.g., an income between a minimum and a maximum value, a zip code in a specified range, a birth date older or younger than a specified date, etc. In this embodiment, multiple keys are used for character strings having lengths near the boundaries between keys. Overlapping data ranges are defined at the boundaries between each pair of keys. For example, a K1 can be used for ASCII strings of up to 8 characters. A K2 can be used for strings between 6 and 16 characters, overlapping the range of K1. K3 can be used for between 14 and 32 characters, overlapping K2, and so on. In this embodiment, each record in the overlapping areas is encrypted with each of the overlapping keys. When attempting to match, link or compare records, the encrypted record having the appropriate key is used in the comparison. Two records, each encrypted using K2, are compared, while the K3 encrypted version of one of those records is not compared to the K2 version of the other record. Chart 20, of FIG. 2 illustrates overlapping ranges for keys K4, K5, and K6, applied to "Address line one" data. K4 is applied to strings up to 16 characters, K5 is applied to 14-32 character strings, and K6 is applied to 30-664 character strings. The set of keys, K4-K6 is sufficient to cover 100% of the "Address line one" data.

Length specific functionality can be carried over into storage of the records. In an embodiment, data tables can be attribute based wherein each table is sized according to the string lengths of the attribute such that storage space is allocated efficiently according to record size and not uniformly, wasting space. As an example, attributes with strings up to 16 characters are placed in a table sized for 16 character entries, attributes with strings up to 32 characters are placed in a table sized for 32 character strings, and so on.

After two records have been successfully matched, they may be linked or otherwise combined. Data from one record can be used to update the second record. Some comparisons can be used in the aggregation of data records while preserving the privacy provided by encryption. A data set can be evaluated to determine the distribution of records across one or more localities as defined by city, state, country, zip code etc. Records can be evaluated according to demographic information without decrypting any of the records by comparing attributes using the encrypted values.

Figure 1:
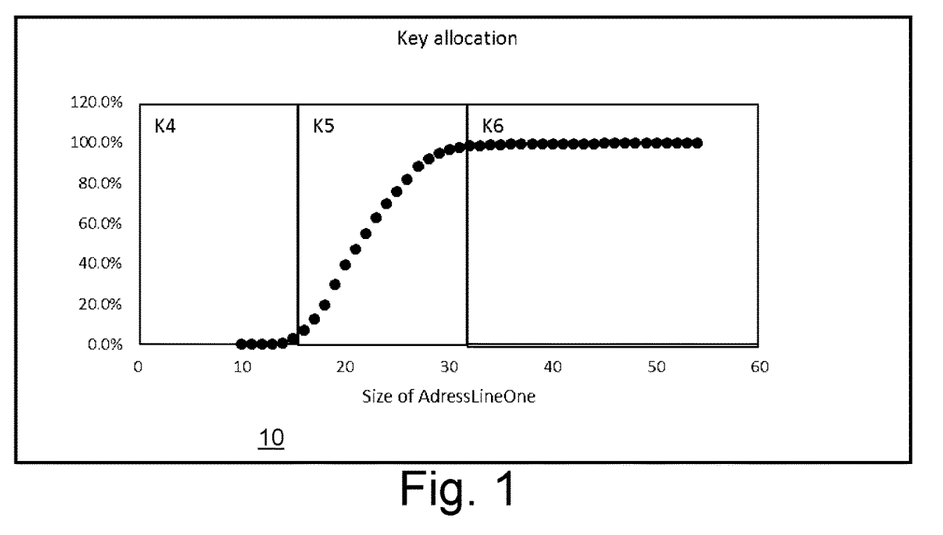
FIG. 1 provides a graphical depiction of a set of encryption keys applied to a data set, according to an embodiment of the invention.
Figure 3:
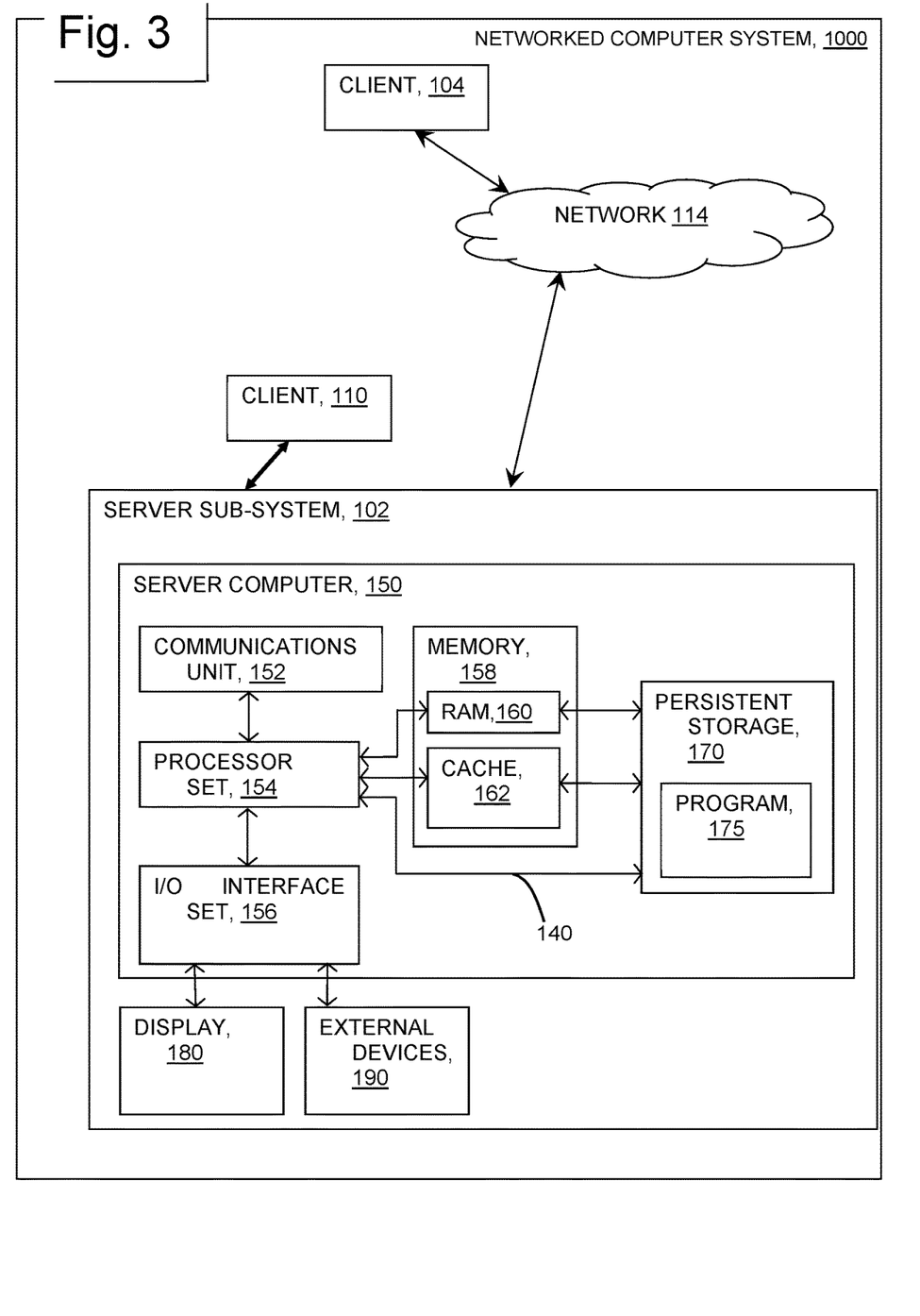
FIG. 3 provides a schematic illustration of a system, according to an embodiment of the invention.

FIG. 3 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise adaptive encryption application program (not shown) together with sufficient computing resource (processor, memory, network communications hardware) to execute the program. In an embodiment, client devices 104 and 110 receive raw data, standardize, categorize, index and encrypt the raw data using one or more keys provided by the server sub-system 102. The encrypted data is then passed to the server subsystem 102, for storage and further processing. As shown in FIG. 3, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the adaptive encryption program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., adaptive encryption program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 4:
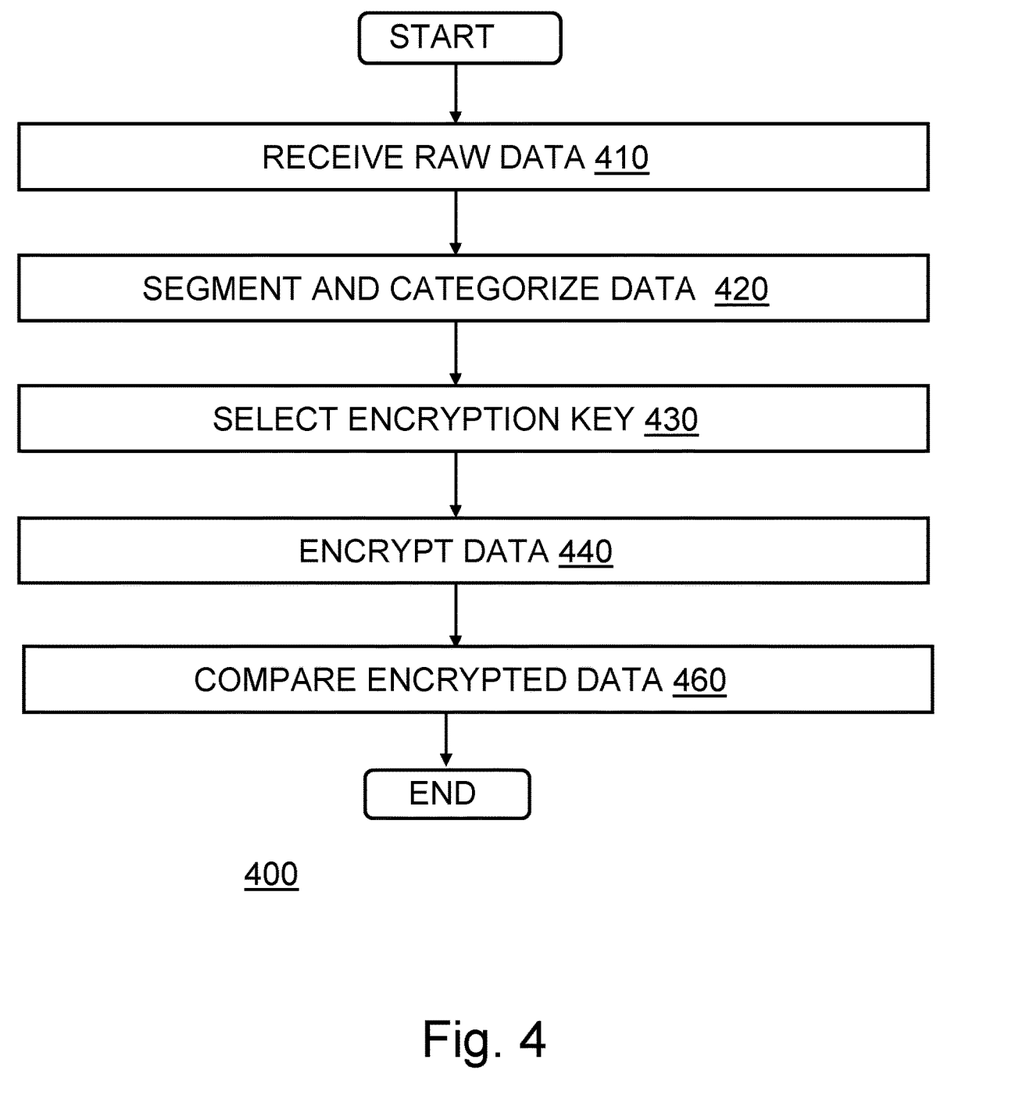
FIG. 4 provides a flowchart depicting an operational sequence, according to an embodiment of the invention.

FIG. 4 provides a flowchart 400, illustrating exemplary activities associated with the practice of the disclosure. After program start, the processor(s) 154 of a client device receives raw data at 410. The raw data comprises one or more data records. Each data record includes one or more data fields or attributes, such as name, ID, address, income, phone number, etc. The processor(s) 154 segments that data—categorizes, indexes, and places the data into buckets—at 420. The raw data records can be categorized and segmented according to data attributes, with the data instances of each data attribute of the raw data record processed independently while maintaining the set of segmented attributes as a single data record. The raw data records can be categorized and segmented according to data attribute length either independent of attribute type or in addition to attribute type. In an embodiment, the categorized data segments are indexed to simplify future searches of the data. The indexed data is placed in buckets. Data in each bucket is therefore data that has been categorized according to attribute, string length, or both, and indexed to facilitate future searches. At 430, the system selects an encryption key according to the category or bucket. Each data instance of that attribute is encrypted using the same encryption key while data instance of other attributes of the raw data records can be encrypted using other keys of a different key length assigned to those attributes.

The system can define a set of keys according to the set of data attributes of the data records and their associated string lengths. In an embodiment, attributes having longer string lengths are assigned a longer length encryption key. In an embodiment, the keys are defined by the processor of the server sub-system 102 and shared with the client devices 104 and 110 for use on the raw data. The system then encrypts the data using the selected key (or keys), at 440. The encrypted data can be passed to the server sub-system and stored in tables in memory or persistent storage, sized according to the string lengths associated with the attribute category, or bucket from which the data record was taken. In an embodiment, the indexed data is placed in buckets according to the length of the character string of the data. Encryption keys are then selected according to the maximum character string length of the bucket. In an embodiment, the data is categorized according to attribute first and then string length so that a set of keys of different lengths are selected for each attribute. At 460, encrypted data records are compared for the purpose of matching and/or linking the records, or records can be processed by a user query to determine how records map to the conditions of the query without any need to decrypt the records.

Figure 5:
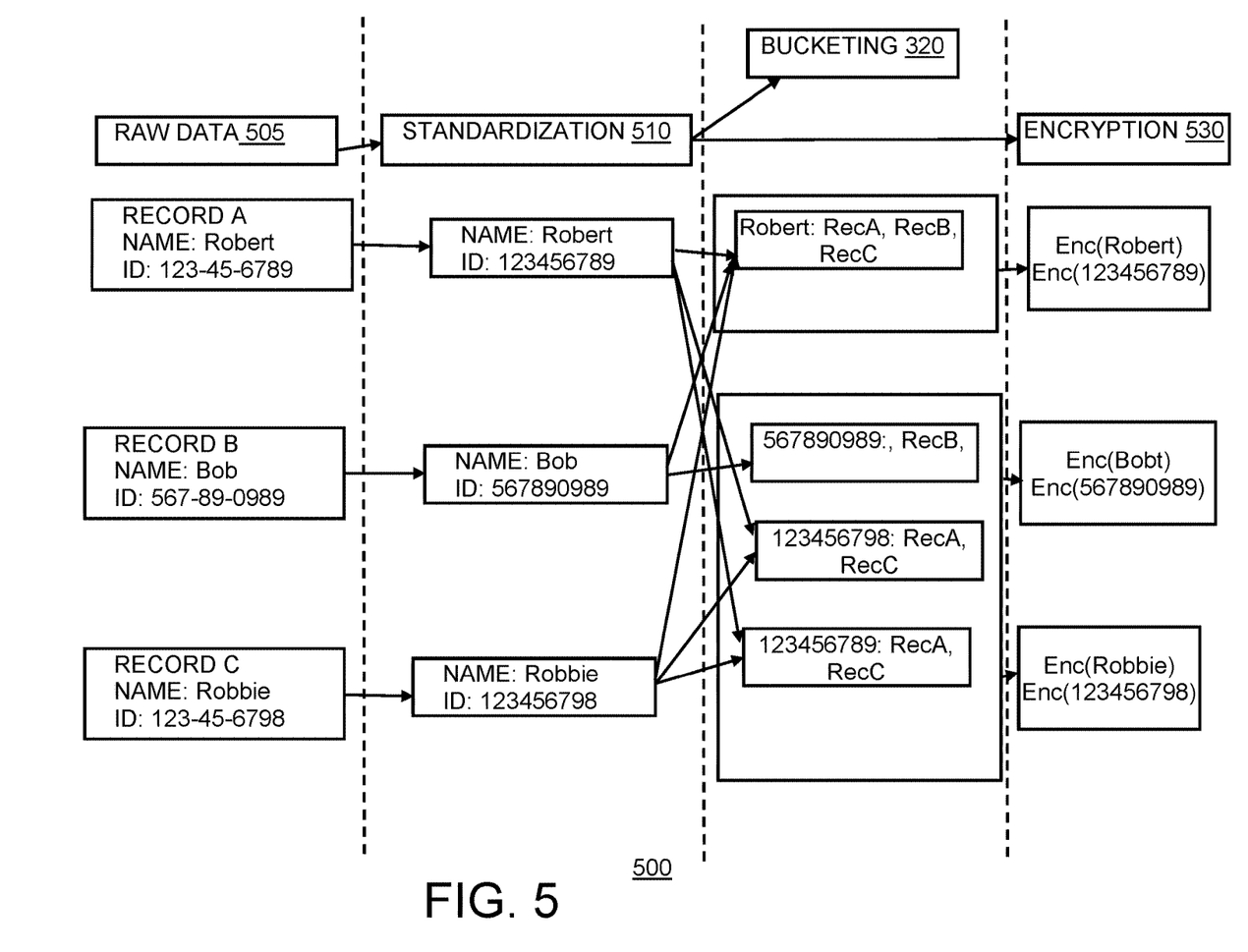
FIG. 5 depicts a block diagram example of functional steps, according to an embodiment of the invention.

FIG. 5 provides a block illustration 500 of steps according to an embodiment of the invention. As provided in the figure, raw data records A, B, and C, are presented at 505. At 510, the records are standardized, the dashes are removed from the ID numbers of the records. At 520, the records are indexed and placed into Name and ID buckets. Each record is associated with the name bucket Robert due to the use of meta data mapped to the "Robert" name bucket, including Bob, and Robbie as alternatives for Robert. The ID numbers of each of records A and C are mapped to both of ID buckets 123456789, and 123456798, as the edit distance between the two ID number records is short and both are associated with the name bucket "Robert". Record B is mapped to the ID bucket 567890989. Encrypted records are then created at 530. Each attribute of each record is encrypted separately using a key having a length determined by the attribute, the data string length, or a combination of those. The encrypted records can then be compared in matching and linking comparison operations (not shown).

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for securely matching encrypted entities, the method comprising:
    receiving data;
    segmenting the data, into a plurality of data categories;
    defining the plurality of data categories according to data string length, wherein the plurality of data categories includes overlapping data categories;
    assigning multiple encryption keys to first data strings in overlapping categories of the overlapping data categories;
    encrypting the first data strings using each of the multiple encryption keys assigned to the first data strings; and
    matching the encrypted first data strings with previously encrypted data strings according to the multiple encryption keys.

2. The computer implemented method according to claim 1, further comprising acting upon a result of matching the encrypted first data strings.

3. The computer implemented method according to claim 1, further comprising standardizing the data.

4. The computer implemented method according to claim 1, further comprising selecting an encryption key according to a data token length.

5. The computer implemented method according to claim 1, further comprising storing the encrypted data according to data string length.

6. A computer program product for securely matching encrypted entities, the computer program product comprising one or more computer readable storage devices and stored program instructions on the one or more computer readable storage devices, the stored program instructions comprising:
    program instructions for receiving data;
    program instructions for segmenting the data, into a plurality of data categories;
    program instructions for defining the plurality of data categories according to data string length, wherein the plurality of data categories includes overlapping data categories;
    program instructions for assigning multiple encryption keys to first data strings in overlapping categories of the overlapping data categories;
    program instructions for encrypting the first data strings using each of the multiple encryption keys assigned to the first data strings; and
    program instructions for matching the encrypted first data strings to previously encrypted data strings according to the multiple encryption keys.

7. The computer program product according to claim 6, the stored program instructions further comprising program instructions for acting upon a result of matching encrypted first data strings.

8. The computer program product according to claim 6, the stored program instructions further comprising program instructions for standardizing the data.

9. The computer program product according to claim 6, the stored program instructions further comprising program instructions for selecting an encryption key according to a data string length.

10. The computer program product according to claim 6, the stored program instructions further comprising program instructions for storing encrypted data according to data string length.

11. A computer system for securely matching encrypted entities, the computer system comprising:
    one or more computer processors;
    one or more computer readable storage devices;
    stored program instructions on the one or more computer readable storage devices for execution by the one or more computer processors, the stored program instructions comprising:
    program instructions for receiving data;
    program instructions for segmenting the data, into a plurality of data categories;
    program instructions for defining the plurality of data categories according to data string length, wherein the plurality of data categories includes overlapping data categories;
    program instructions for assigning multiple encryption keys to first data strings in overlapping categories of the overlapping data categories;
    program instructions for encrypting the first data strings using each of the multiple encryption keys assigned to the first data strings; and program instructions for matching the encrypted first data strings to previously encrypted data strings according to the multiple encryption keys.

12. The computer system according to claim 11, the stored program instructions further comprising program instructions for acting upon a result of matching encrypted first data strings.

13. The computer system according to claim 11, the stored program instructions further comprising program instructions for selecting an encryption key according to a data string length.

14. The computer system according to claim 11, the stored program instructions further comprising program instructions for storing encrypted data according to data string length.

* * * * *